(12) United States Patent
Vijayaraghavan et al.

(10) Patent No.: US 10,482,521 B2
(45) Date of Patent: *Nov. 19, 2019

(54) INTENT PREDICTION BASED RECOMMENDATION SYSTEM USING DATA COMBINED FROM MULTIPLE CHANNELS

(71) Applicant: [24]7.ai, Inc., San Jose, CA (US)

(72) Inventors: Ravi Vijayaraghavan, Bangalore (IN); Subhash Ramchandra Kulkarni, Bangalore (IN); Kranthi Mitra Adusumilli, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/481,361

(22) Filed: Apr. 6, 2017

(65) Prior Publication Data

US 2017/0213274 A1 Jul. 27, 2017

Related U.S. Application Data

(63) Continuation of application No. 14/154,120, filed on Jan. 13, 2014, now Pat. No. 9,652,797.

(Continued)

(51) Int. Cl.
*G06Q 30/06* (2012.01)
*G06F 16/951* (2019.01)
*G06Q 30/02* (2012.01)

(52) U.S. Cl.
CPC ....... *G06Q 30/0631* (2013.01); *G06F 16/951* (2019.01); *G06Q 30/0201* (2013.01); *G06Q 30/02* (2013.01)

(58) Field of Classification Search
CPC ................................. G06Q 30/06–08
See application file for complete search history.

(56) References Cited

U.S. PATENT DOCUMENTS

| 4,720,706 A | 1/1988 | Stine |
| 6,054,707 A | 4/2000 | Hou et al. |

(Continued)

FOREIGN PATENT DOCUMENTS

WO 2010027611 A2 3/2010

OTHER PUBLICATIONS

Clustering Query Refinements by User Intent, Sadikov et al. Proceedings of the 19th international conference on World wide web (Year: 2010).*

(Continued)

*Primary Examiner* — Ming Shui
(74) *Attorney, Agent, or Firm* — Perkins Coie LLP; Michael A. Glenn

(57) ABSTRACT

User intent is identified while the user browses online and recommendations are provided to the user. The recommendations are based on the identified intent, interests, and preferences of the user who is performing the searches. The determination of user intent and interests is based on a statistical model derived from data compiled from the user and a plurality of other users. Other resources may also be determined to be relevant, for example, because of past interactions of the user, memberships of the user in ecommerce websites, the user's interests and preferences are similar to those of other users, and so on. The result of the user search is a ranked set of recommendations that is provided to the user.

23 Claims, 6 Drawing Sheets

Related U.S. Application Data

(60) Provisional application No. 61/754,300, filed on Jan. 18, 2013.

(56) References Cited

U.S. PATENT DOCUMENTS

| | | |
|---|---|---|
| 8,103,118 B2 | 1/2012 | Foo et al. |
| 8,423,538 B1 | 4/2013 | Sadikov et al. |
| 8,638,317 B2 | 1/2014 | Harada et al. |
| 2005/0198068 A1 | 9/2005 | Mukherjee et al. |
| 2009/0119289 A1 | 5/2009 | Gibbs et al. |
| 2011/0007102 A1 | 1/2011 | Ogura et al. |
| 2011/0252026 A1 | 10/2011 | Schmidt et al. |
| 2012/0092461 A1 | 4/2012 | Fisker et al. |
| 2012/0143718 A1 | 6/2012 | Graham et al. |
| 2012/0321149 A1 | 12/2012 | Carver et al. |
| 2012/0330992 A1 | 12/2012 | Kanigsberg et al. |
| 2014/0218772 A1 | 8/2014 | Koshimizu et al. |
| 2016/0153903 A1 | 6/2016 | Ono |
| 2016/0162732 A1 | 6/2016 | Suzuki et al. |

OTHER PUBLICATIONS

Research Online, Purchase Offline (ROPO) The role of the internet in the decision making process for mobile and DSL (Year: 2010).*

* cited by examiner

FIG. 6

INTENT PREDICTION BASED RECOMMENDATION SYSTEM USING DATA COMBINED FROM MULTIPLE CHANNELS

CROSS REFERENCE TO RELATED APPLICATIONS

This application is a continuation of U.S. patent application Ser. No. 14/154,120, filed Jan. 13, 2014, now U.S. Pat. No. 9,652,797, which claims priority to U.S. provisional patent application Ser. No. 61/754,300, filed Jan. 18, 2013, each of which applications are incorporated herein in their entirety by this reference thereto.

BACKGROUND OF THE INVENTION

Technical Field

The invention relates to providing recommendations. More particularly, the invention relates to providing recommendations based on the user's intent and the similarity of the user's preferences to those of other users.

Description of the Background Art

Websites, such as e-commerce sites and other interactive systems, usually include recommendation systems to provide personalized recommendations with regard to items that are available in their inventory. Such recommendation systems are based on tracking user activities or behavior and, in some cases, based on the users' explicit rating of products.

Existing recommendation systems provide recommendations based on the nature of what a user has seen or rated and/or the behavior exhibited by similar users who exhibit similar behavioral patterns. There are also recommendation systems that implement product-to-product mapping, which considers the similarity of products to historically browsed products and the present product.

Unfortunately, such systems often fail to provide useful recommendations, and often provide erroneous recommendations, which can frustrate or annoy the user.

SUMMARY OF THE INVENTION

Embodiments of the invention identify user intent while the user performs Web searches, Web journeys, multi-channel journeys, and activities that generate data from multi-channels, and the like, for example by use of a personal computer, mobile device, or other device, and accordingly provides recommendations to the user. The recommendations are based on the identified intent, interests, and preferences of the user who is browsing. In embodiments of the invention, the determination of user intent and interests is based on a statistical model derived from data compiled from the user and a plurality of other users. Other resources may also be determined to be relevant, for example, because of past interactions of the user, memberships of the user in ecommerce websites, the user's interests and preferences are similar to those of other users, and so on. During the course of user journey, at an appropriate instance a ranked set of recommendation is shown to the user.

BRIEF DESCRIPTION OF THE DRAWINGS

FIG. 6 is a Web page showing a use case involving price sensitive intent according to the invention.

DETAILED DESCRIPTION OF THE INVENTION

Figure 1:
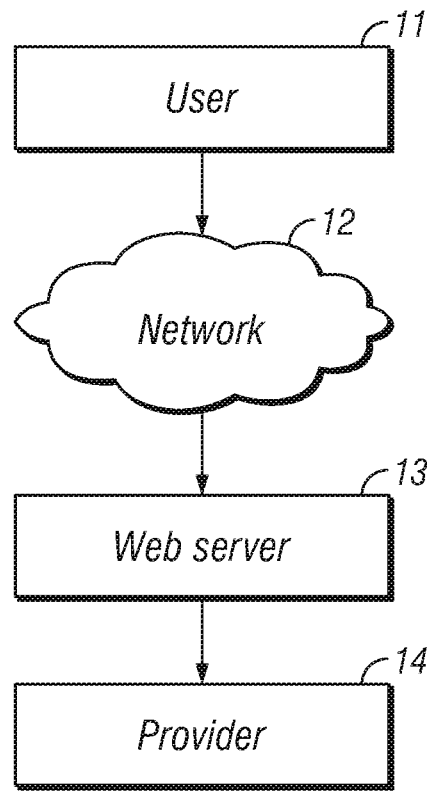
FIG. 1 is a block schematic diagram showing a user contacting a provider according to the invention.

Businesses prefer to make recommendations that offer a user goods and services that are highly relevant to the user, and thereby maximize the likelihood that the user, for example, makes a purchase, or that appropriately solve the user's issues, for example by a recommendation for service issues, e.g. as a dynamic FAQ. Embodiments of the invention identify the intent of the user and provide recommendations to the user based on that intent. Various user preferences are also considered in the making of the recommendations.

Embodiments of the invention provide recommendations based on user intent prediction. Such intent prediction, in turn, takes into account various aspects of the user, such as the user's previous intents, journeys, etc., along with the user's present journey. Data from multiple channels is combined and used to make the prediction. In addition to the content provided to the user in the recommendation, details within the recommendation itself are customized in accordance with the identified intent of the user.

In embodiments of the invention, the user communicates with a provider of goods ad/or services using any of a variety of devices, channels, and communication techniques. In some embodiments of the invention, a search query submitted by the user is matched with previous queries made by the user and by other users. When positing the query, the user may be searching on a search engine, browsing a particular website, on a journey, or any or all of these. In other embodiments of the invention, Web journeys, multi-channel journeys, and activities that generate data from multi-channels, and the like are used to gather information about the user. Thus, for purposes of the discussion herein, the term "query" refers to any user engagement with, or navigation of, an online information source; the term "query" is not limited to search engine queries or searches in general, but may be any expressed or implied user behavior with regard to online information. User intent and interests are inferred from the matching and an ordered list of query results is presented to the user. Additional resources relevant to the query are identified based on matching the query to previous queries. For purposes of the discussion herein, such sources of information for the recommendations can include, but are not limited to, catalogs, ads, product information, a database, etc. User information is also stored in a database for reference and modeling purposes (discussed below).

Embodiments of the invention take into account user related information, e.g. past interactions, previous purchase history, geographical location, time of day, client device used, operating system, along with the current browsing session. The previous activities of the user are thought to be a better predictor of the user's current intent than the activities of similar users. However, where insufficient information is available about the user, or the user is a new visitor to, e.g. a website, then the activities of a group of similar users provides a basis for determining the current user's intent.

During the browsing session, if the user requires any assistance, the user interacts with the provider for a variety of reasons. For example, the user may seek to contact the provider for certain information on a price structure of a product, queries may be posed with regard to certain aspects of the products and/or services offered, assistance in purchasing the product may be requested, and so on. In such case, the user may use any of various channels, such as call; click; device, e.g. mobile and/or personal computer; combinations of these channels; the channels may be used in series, e.g. call after browsing; or the channels may be used simultaneously, e.g. omni-channel.

Embodiments of the invention proactively identify the need of the user and, in some cases, initiate user contact and/or interaction with the provider, for example through chat sessions, telephonic contact with the call center, etc. Based on the information gathered through such interactions, as well as the past activities, a recommendation is provided to the user.

Embodiments of the invention relate to recommendation systems and to compiling information and a user-related search history to generate user-specific recommendations. The intent of the user is identified and suitable recommendations are provided to the user, based on the user's preferences. A notification is then sent to the user with the recommended features and products.

FIG. 1 is a block schematic diagram showing a user contacting a provider according to the invention. As shown in FIG. 1, the system comprises a network 12, a Web server 13, and a provider 14. A user 11 communicates and/or interacts with the provider through the network and the Web server, which enable the communication and/or interaction.

In embodiments of the invention, the user may be an individual, group, organization, client, server, and the like. In embodiments of the invention, the user may communicate and/or interact with the provider via a user device, which device may be any of a mobile phone, desktop computer, laptop, tablet, or any other device which enables the communication.

The network may use any suitable communication technology to communicate with the user. The provider may be any provider of information, services, and/or goods. In embodiments of the invention, communication or interaction occurs between the user and the provider through an agent of the provider. The agent may be a human agent and/or it may be an automated or other mechanism which enables the interaction.

The user communicates with the provider via at least one of a plurality of channels. The user can use the Web server to link to the provider or the user can communicate directly with the provider. The user can also contact the provider through a mobile device and the like or be linked to the provider through various third party channels.

For purposes of the discussion herein, the terms communicate and interact are used for the purposes of illustration. The user may not ideally communicate and/or interact with the provider. Rather, the user may just be seeking information about various products and/or features and, in such case, recommendations may be provided to the user proactively.

Figure 2:
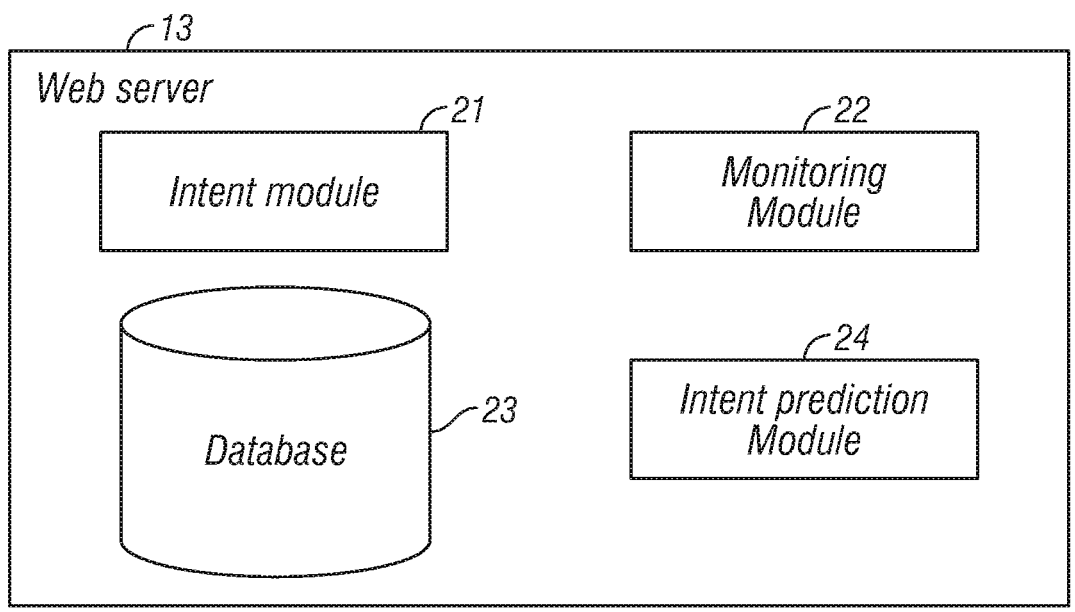
FIG. 2 is a block schematic diagram showing components and functioning of the Web server according to the invention.

FIG. 2 is a block schematic diagram showing components and functioning of the Web server according to the invention. As shown in FIG. 2, the Web server 13 comprises an intent module 21, a monitoring module 22, a database 23, and an intent prediction module 24. Those skilled in the art will appreciate that the functions performed by the Web server can be distributed and need not be performed by a server.

The intent module 21 receives a query from the user via the network. In embodiments of the invention, the intent module matches the received query to a previous query to identify a set of resources that are relevant to both the received query and to each of the items in the set of resources, e.g. figures, content, etc. The intent module also compiles information concerning prior user search behavior. From this information, the intent module infers the user's interests and intent. That is, the intent module uses this information to present more relevant search results to subsequent users who execute the same or a similar search query.

The information compiled by the intent module may be acquired from the user subsequent to the user performing a search at a number of search engine websites. The user information may be collected from any of a plurality of sources including, but not limited to the user's device or Internet Service Provider (ISP). Further, the information acquired may include search terms that appear in particular Web pages, one or more websites, and actions taken by the user at the websites. The information may also be collected from a plurality of users and compiled or aggregated to provide a statistical model.

The monitoring module 22 is responsible for tracking user activities in the network. The monitoring module filters out information so that only the necessary user related information is stored in the database 23. The information for each user across channel refers to much of the material that is collected by the system. This material can include, for example, chat text, logs from Web browsing, call transcripts, etc. Storing all of this data and using it in real time is ineffective and it is challenging to use all of this information to build a statistical model. Extracting relevant information from this data, such as key words used in chat, products browsed along with depth of each product interest, etc. is critical. Substantially all of the necessary user-related information gathered from a plurality of sources, as well as, for example in the case of a search, the top number of key words, search strings, tags, and product pages is stored in the database. Accordingly, the database can be used for looking up information upon receiving a new query.

The intent prediction module 24 predicts the outcome of a future selection by the user from a sequence of previous selections made by the user and/or from one or more frequent sequences of previous selections made by a plurality of users. The information and/or data gathered during previous visits of one or more users, including that of the current user, is collected and analyzed to determine in descending order the most frequent sequences of selections. For example, this information can be collected on clicking, e.g. a recommendation is shown and one of the recommendations is clicked on by the user.

When the user initiates a series of selections online, the intent prediction module records each selection in the sequence and adds the most recent selection to the sequence of prior selections that define the journey taken by the user. The journey or sequence currently selected is compared to the most frequent sequences of selections made by a plurality of users. As a result, the current intent of the user is predicted. Based on this prediction, relevant information is displayed or other actions are undertaken to assist the user in making additional or future selections that are necessary to achieve a desired end result (see, for example, FIGS. 5 and 6).

In an embodiment of the invention, the previous activities of a current user are expected to be a better predictor of the user's current intent than the activities of a plurality of users. Where there is insufficient information available about the current user, the activities of a group of similar users provides a basis for determining the current user's intent.

Figure 3:
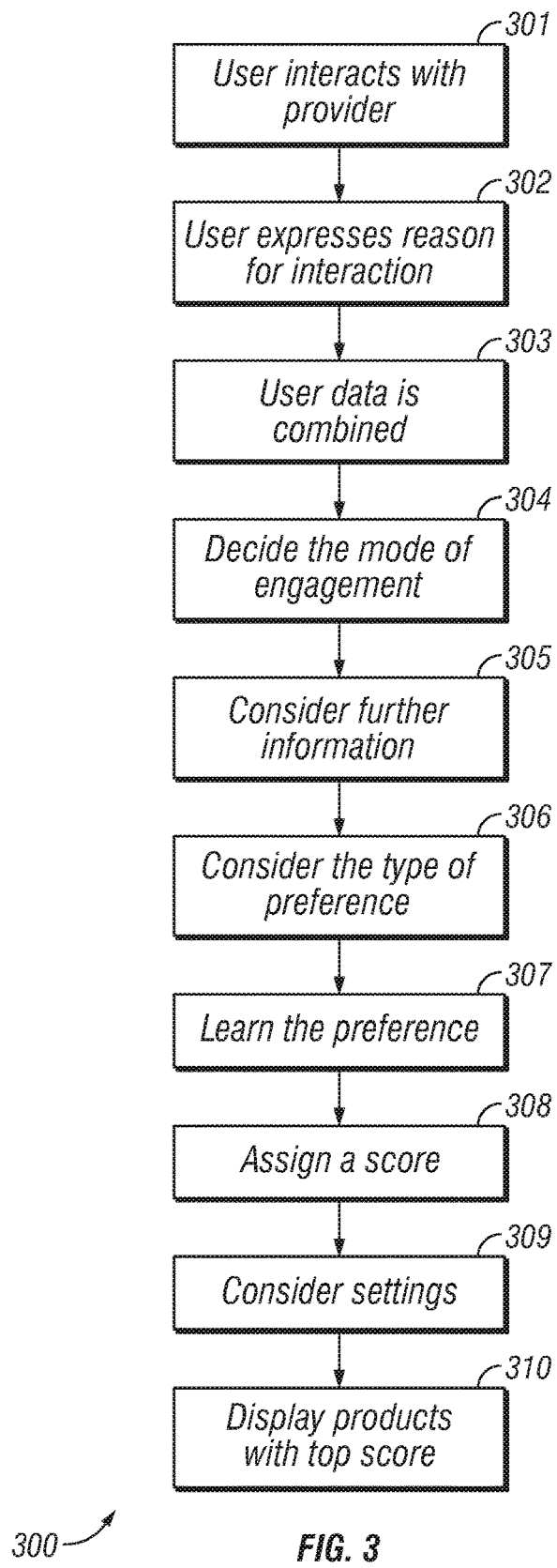
FIG. 3 is flow diagram showing the process of identifying user intent according to the invention.

FIG. 3 is flow diagram showing the process of identifying user intent (300) according to the invention. Initially, the user interacts (301) with the provider for a plurality of reasons.

In an embodiment of the invention, the user may want to contact the provider, for example, for certain information, queries on certain aspects of the products and/or services offered, assistance in purchasing the product, and so on.

In another embodiment of the invention, the user establishes direct contact or interaction with the provider in any of a plurality of ways. For example, customer A is a member of an e-commerce website, where he has a significant purchase history. Customer A may directly log on the website and proceed with an intended task. On the other hand, customer B may search for e-commerce websites through the intent module and then proceed forward with any of the relevant matches.

Other ways of initiating contact and/or interaction with the provider include chat sessions, telephonic contact with a call center, filling out surveys, online communities or forums maintained by the provider, social networking websites, and the like.

From the interactions with the provider, the user implicitly, e.g. by clicking, or explicitly, e.g. by mentioning a product, etc., in a chat or search, expresses (302) the reason for interaction, which is tracked by the monitoring module. The intent prediction module combines (303) substantially all of the user-related data across all channels and user interactions. In this way, an indication of the basic nature, as well as the intent of the user, is generated, which is co-relatable to information, goods, and/or services of a specific provider. In an embodiment of the invention, the user related data is combined using machine learning and data mining techniques.

The intent of the user can also be better gauged by integrating various data sources. Unique identifiers are created, captured, and/or passed between multiple contact channels, e.g. Web, mobile, interactive voice response (IVR), phone, automotive, television, to identify and tag the user and their context, e.g. history, past behavior, steps progressed, obstacles and/or issues encountered, etc., uniquely (see commonly assigned U.S. patent application Ser. No. 13/897,233, filed May 17, 2013, which application is incorporated herein in its entirety by this reference thereto).

Understanding the intent of the user when the user interacts with the provider also leads to an understanding that each user may require a specific type of engagement mode. Thus, a user may be classified as price conscious, feature conscious, brand conscious, service conscious, and so on. For example, customer A may be a price conscious customer who wants to purchase or obtain products in a certain price range, while customer B may be a brand conscious customer who prefers to purchase or obtain products of a certain brand. For both of these customers it is imperative to display the price and brand of the products of the provider, respectively. To identify the preferences of the user, user-related information, such as past interactions, purchase history, geographical location, time of day, client device used, operating system, and so on, is considered.

The intent prediction module determines (304) the mode of engagement and also considers (305) user-related information from the database. In certain cases, even when the user may have a specific intent, e.g. an inexpensive mobile phone, the user may have additional preferences, such as the brand, size, sound output, and so on. On a decision level to purchase a mobile phone, the original intent and preferences are considered and, on an aggregate level, users who exhibit similar intent are considered to have similar preferences in terms of various aspects of the product considered. Once the intent prediction module learns (307) the preference of the user, a score or rating may be assigned (308). This score is essentially equivalent to the probability that the user intent is a specific intent. The score can be some monotonic function of the above mentioned probability. For example, a customer searching for an inexpensive mobile phone may also consider certain other factors, such as battery life, type of operating system, and so on. The fact that the user is searching based on such other factors is exhibited, for example, through the user's external or internal searches, drop-down selections on the provider's website, or the when the user only browses through similar products which have such features.

Based on the user's exhibited behavior, i.e. the user's preferences that were learned based on the user's exhibited behavior, a weightage given to the specific feature is adjusted to be high when compared to other features. For purposes of various embodiments of the invention, weightage is a number, i.e. the parameterization aspect of FIG. 4. In an embodiment of the invention, the factors considered when inferring the user's preference may be any of, for example, the amount of time that the user spent viewing the product, the number of times the product was viewed, ratings for the specific product, and so on. Therefore, the implicit and explicit user behavior, and behavior of similar users as well, is monitored.

Figure 4:
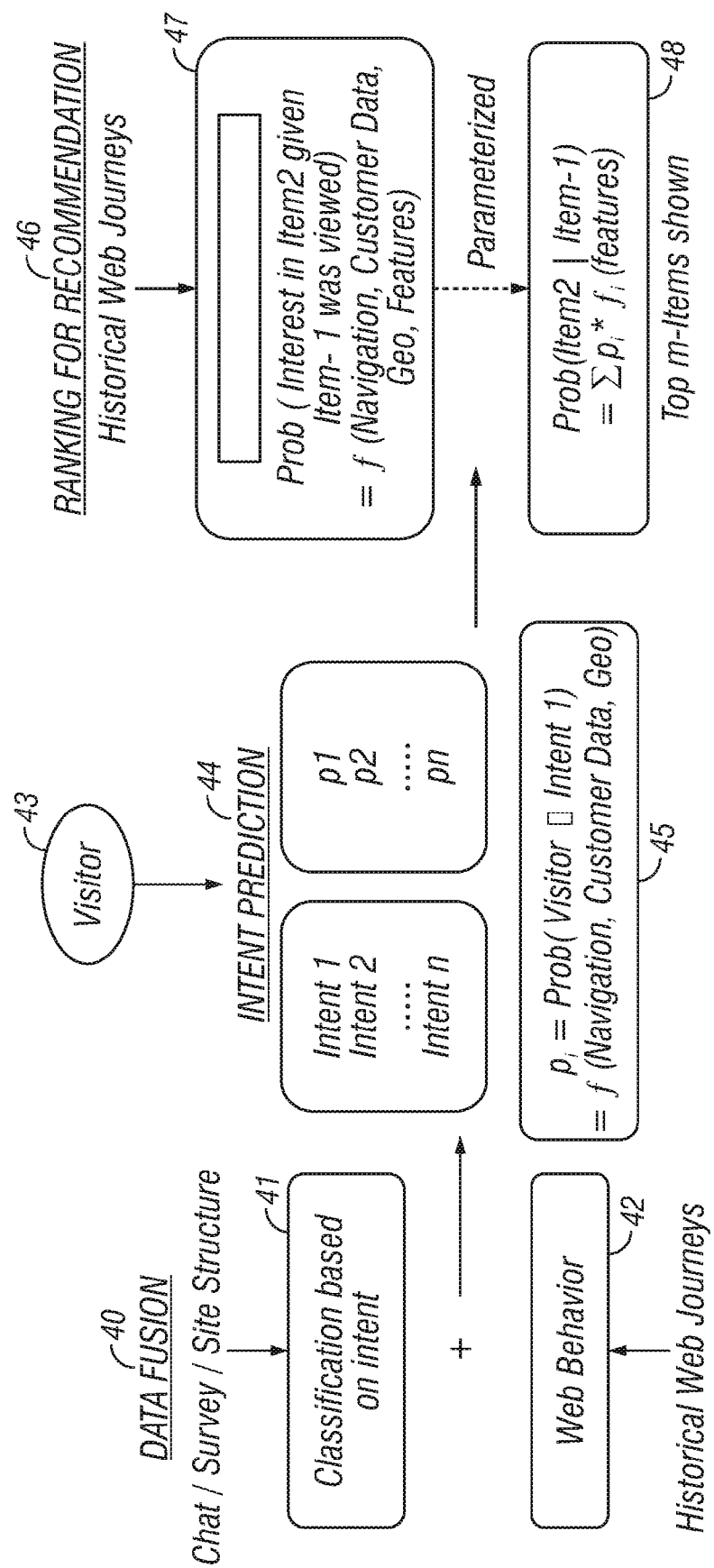
FIG. 4 is a block schematic diagram showing recommendations based on visitor intent and product similarity according to the invention.

In an embodiment of the invention, a score for user preferences is generated by a ranking procedure, statistical function, or any other relevant scoring method (see FIG. 4, for example). The user is assigned different weights for each of the aspects, and all of the weights considered together comprise the preference. Assignment of a score considers each aspect of decision making in the specific product and, accordingly, the weights for user preferences are aggregated, for example by multiplication or addition of each weight into a single score for a specific product (see FIGS. 5 and 6, for example). Further, as more information about the user interaction is known, a default preference may be adjusted to be in line with the user's exhibited behavior.

Once the settings are considered (309) for the users, the intent prediction module displays (310) products having the highest scores. The products may be displayed through a plurality of channels and each channel may have a different setting for top products. For example, for Short Message Service (SMS) messages the top three products may be displayed and/or conveyed; whereas while browsing a website the top five products may be displayed.

Prediction of user intent is a real time predictive analysis that is performed to create a list of service consumption and/or purchase possibilities. Further, the intent prediction process builds upon a user profile that is created from, for example, historical purchase and/or payment data and coupon redemption data. The intent prediction process compiles or extrapolates the user profile with information such as the geo-location of the user, user interest categories, a time stamp, and other contextual information, such as check-ins in the website, data from social networking websites, and so on.

For a further discussion of user context, e.g. journey, intent, actions, steps, experience to date, historical behavior, preferences, etc., as well as predictive techniques applied to such user context see, for example, commonly assigned U.S. patent application Ser. No. 13/239,195, filed Sep. 21, 2011 (Predictive User Service Environment); Ser. No. 13/349,807, filed Jan. 13, 2012 (Method And Apparatus For Analyzing And Applying Data Related To User Interactions With Social Media); Ser. No. 13/454,726, filed Apr. 24, 2012 (Method and Apparatus For Enhancing User Service Experience); Ser. No. 13/461,631, filed May 1, 2012 (Method and Apparatus For Analyzing and Applying Data Related To User Interactions With Social Media); Ser. No. 13/443,782, filed Apr. 10, 2012 (Method and Apparatus For Predictive Enrichment Of Search In An Enterprise); Ser. No. 13/599,974, filed Aug. 30, 2012 (User Journey Prediction and Resolution); and Ser. No. 13/852,942, filed Mar. 28, 2013 (Method and Apparatus For Intent Modeling and Prediction), each of which application is incorporated herein in its entirety by this reference thereto.

Finally, certain features and products are recommended to the user that suit the user's preferences. The recommendation may be provided in the form of a widget, pop-up, Short Message Service (SMS) text message, or the like. The recommendation mechanism can include listings, such as recently viewed products, items seen by similar users, items similar to presently seen items, and so on (see FIGS. 5 and 6, for example).

Those skilled in the art will appreciate that the various actions shown in FIG. 3 may be performed in the order presented, in a different order, or simultaneously. Further, in some embodiments of the invention, some actions listed in FIG. 3 may be omitted.

FIG. 4 is a block schematic diagram showing recommendations based on visitor intent and product similarity, which is the product association as defined by various features, according to the invention. In FIG. 4, a data fusion stage 40 uses any of chat, survey, and site structure data and classifies such data based on user intent 41. Historical Web journeys are also applied to identify user Web behavior 42. At the data fusion stage, for each specific user, user intent is obtained explicitly and/or implicitly from any chat survey, and site structure data is combined with associated historical Web journeys of the particular user. This combined data is used to build an intent based classification method 41. This method relies on machine learning and statistical techniques and in general is referred to as intent prediction.

Those skilled in the art will appreciate that the invention is not limited to the specific features of FIG. 4 and is not restricted to the Web, but includes the use of data across all possible interactions and channels. For purposes of example only, FIG. 4 shows the Web as the main source channel and source of information for intent being substantiated by interaction on the Web.

The results of the data fusion stage are applied to an intent prediction stage 44. For example, when a visitor 43 visits a website or posits a query, a series of intents are identified, each intent having a related probability, based on an intent prediction function 45, that is:

$$p_1 = \text{Prob}(\text{Visitor} \in \text{Intent1}) = f(\text{Navigation}, \text{Customer Data}, \text{Geo}) \quad (1)$$

The recommendation stage 46, takes into consideration various aspects of the user, along with the interests exhibited in the product to the present, to establish interest in other products (items). For this purpose, historical Web journeys are used for offline development of an appropriate function of the form in 47, that is:

$$\text{Prob}(\text{Interest in Item2 given Item1 was viewed}) = f(\text{Navigation}, \text{Customer Data}, \text{Geo}, \text{Features}) \quad (2)$$

The above equation is a simplification to degree one, i.e. considering two products at a time. In general, the function should include the user's interest in each of the items, given the list of items viewed to the present.

For quicker and scalable learning and real time evaluation of the interest, the above function 47 is simplified, i.e. parameterized such that only features such as price, color of the product, discount, brand. etc. are taken into consideration for associating interest with regard to a product, given the list of products viewed to the present. Other user data from a plurality of channels can also be considered, such as past history. for example recency of visits, past purchases, etc.; geography and/or demography related information, such as income group; browsing related information, such as whether the user is searching for price discounts, etc.; cross channel behavior, such as the user called to inquire about a product, etc.; and so on when predicting the intent of the user. In 48, via decomposition of 47 into these two components, intent prediction and features based recommendation for each intent class, the scalability and other aspects mentioned above are achieved.

Because, the list of recommendations for each intent class changes and the user exhibits multiple intents with varying degrees of likelihood, a method to combine the recommendation is required. For this above applied function 48, i.e.:

$$\text{Prob}(\text{Item 2} | \text{Item-1}) = \Sigma p_i * f_i(\text{features}) \quad (3)$$

where interest in a product is weighted sum of interest in each intent class I (expressed above as f(.))). The weightage is the probability of the user's intent being that of the specific intent class i (expressed above as p).

The weighted probabilities thus obtained for each product are processed to produce a top m items which comprise recommendations to the user.

In other embodiments of the invention, the previous customer information, such as purchase history and navigation history can be used. In other embodiments of the invention, the dominant attribute can be used to drive the user experience.

Figure 5:
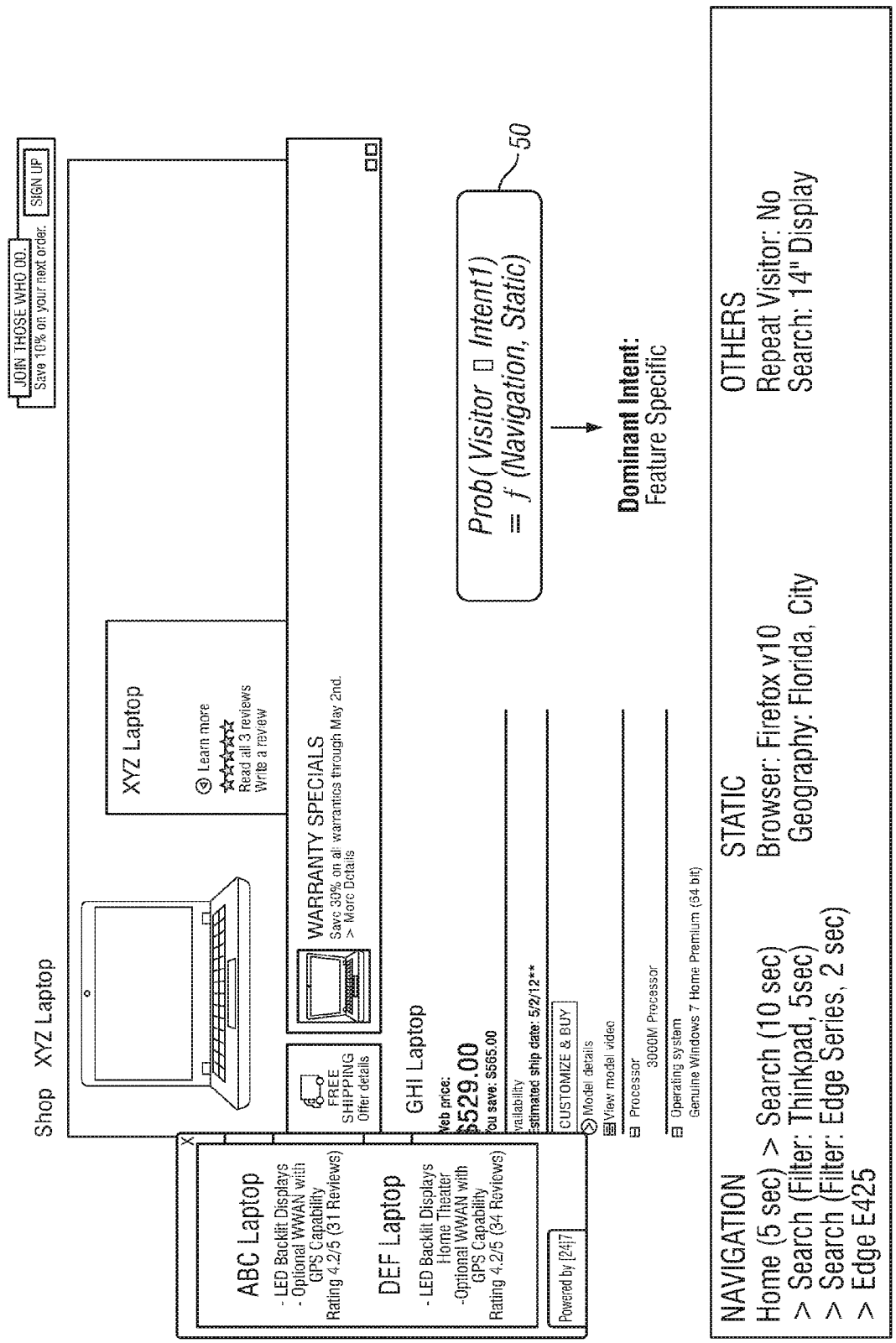
FIG. 5 is a Web page showing a use case involving feature specific intent according to the invention.

FIG. 5 is a Web page showing a use case involving feature specific intent according to the invention. In FIG. 5, navigation, static, and other information within the system is shown and based upon this information, for the current Web page, the user's dominant intent is determined to be feature specific 50.

Figure 6:
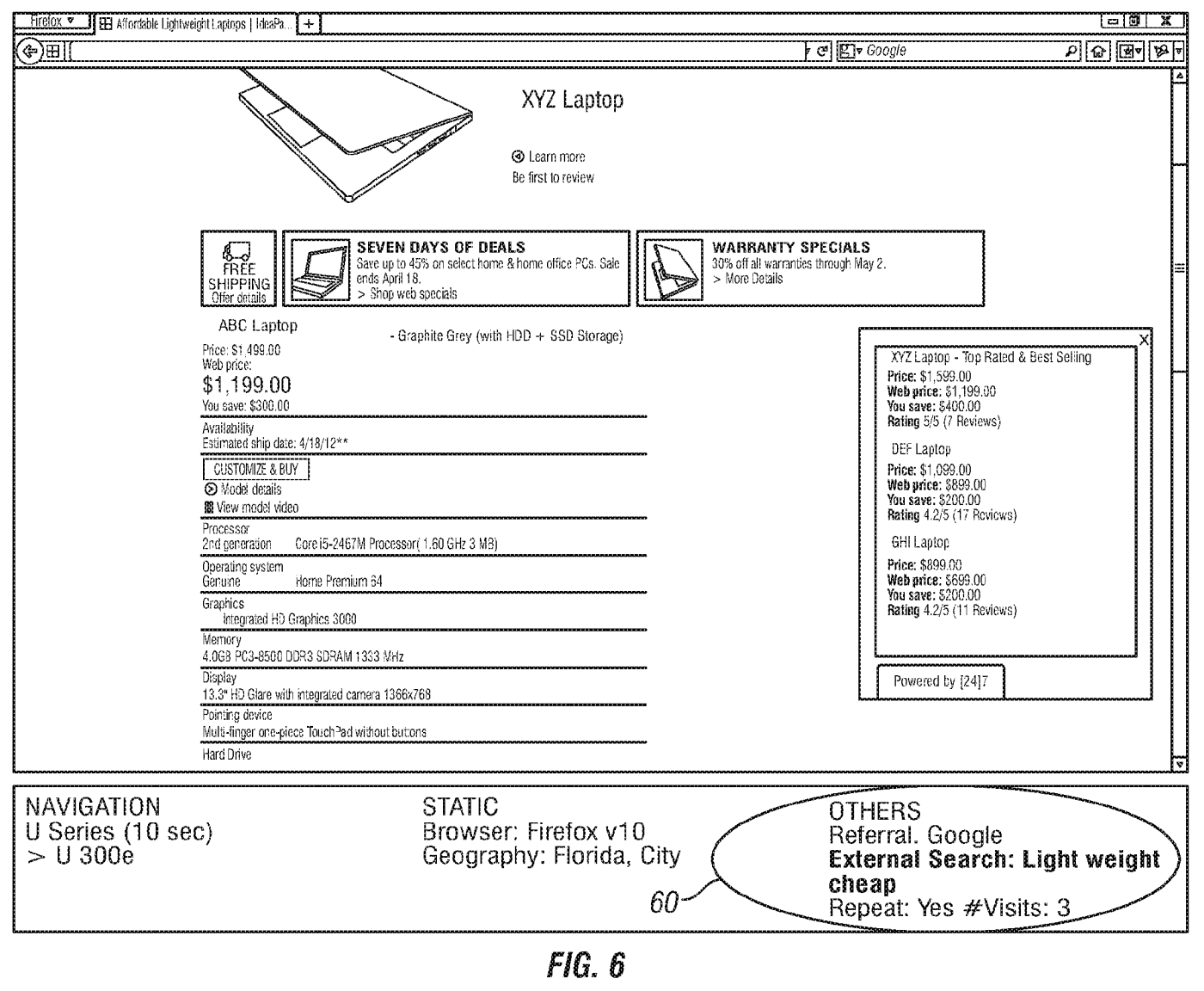

FIG. 6 is a Web page showing a use case involving price sensitive intent according to the invention. In FIG. 6, navigation, static, and other information within the system is shown and based upon this information, for the current Web page, the user's dominant intent is determined to be price sensitive, i.e. based on the external search information 60.

Computer Implementation

The embodiments disclosed herein can be implemented through at least one software program running on at least one hardware device and performing network management functions to control the network elements. The network elements shown in the figures include blocks which can be at least one of a hardware device, or a combination of hardware device and software module.

Figure 7:
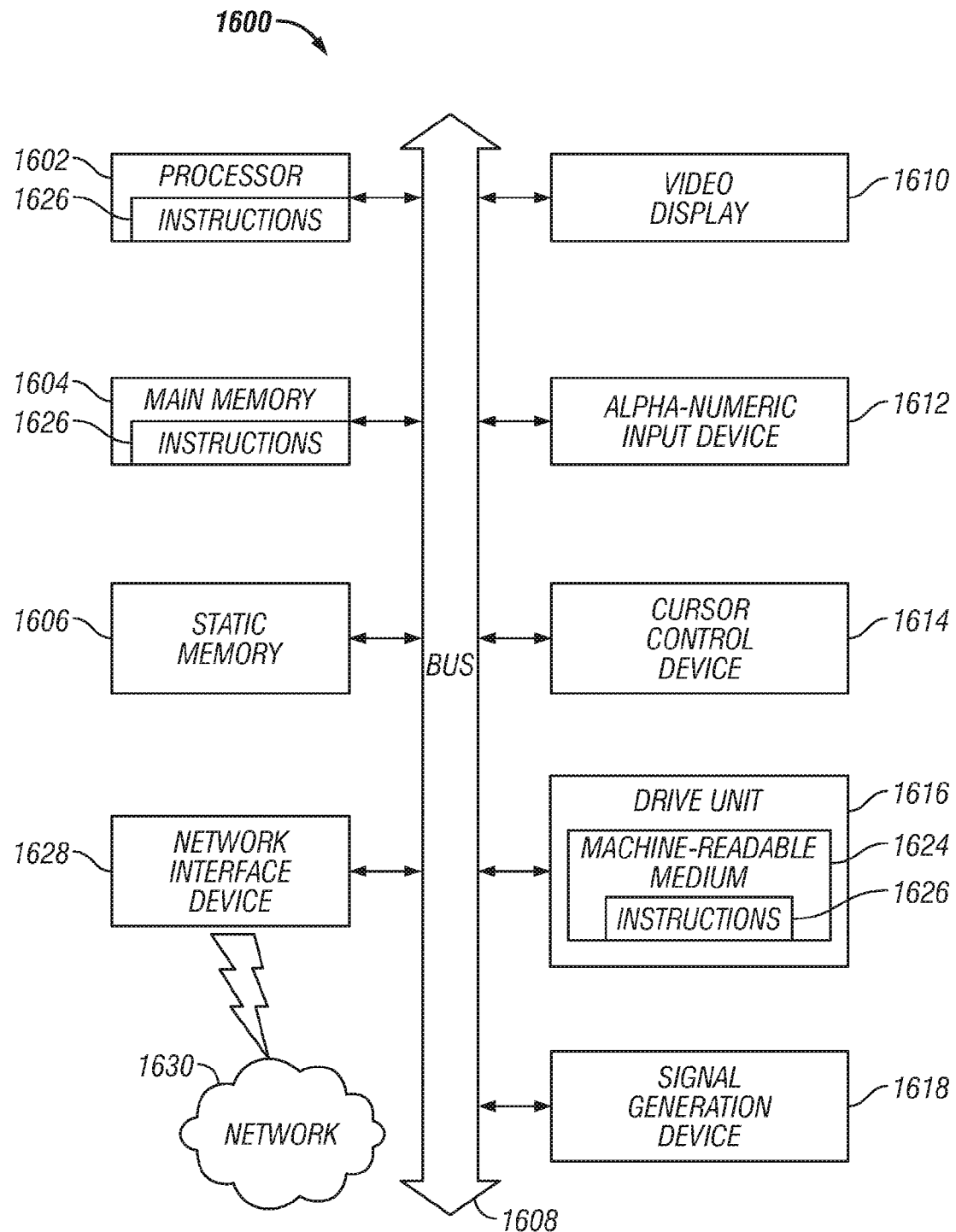
FIG. 7 is a block schematic diagram that depicts a machine in the exemplary form of a computer system within which a set of instructions for causing the machine to perform any of the herein disclosed methodologies may be executed.

FIG. 7 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for making recommendations to a user, comprising:
   providing a processor configured for receiving a query from a user through a plurality of channels;
   during a data fusion stage, said processor configured for using said customer's Web journey, multi-channel journeys, and activities that generate data from multi-channels to match the query received from the user with a previous query from any of said user and one or more other users;
   said processor configured for combining data from said plurality of channels in real time to predict user intent in connection with said identified resources, wherein unique identifiers are created, captured, and/or passed between said plurality of channels to identify and tag the user and the user's context uniquely;
   during an intent prediction stage, said processor configured for predicting in real time an outcome of a future selection by said user from a sequence of previous selections made by any of said user and from one or more frequent sequences of previous selections made by a plurality of users;
   said processor configured for using activities of a group of similar users to provide a basis for determining a current user's intent where insufficient information is available about said user or said user is a new visitor;
   during a recommendation stage, said processor configured for collecting and analyzing information gathered during previous visits of one or more users, including that of a current user, to determine in descending order a most frequent sequence of selections;
   said processor configured for ranking results of said predicting;
   said processor configured for presenting a ranked order of recommended results to said user;
   said processor configured for displaying products or services having the highest scores through any of a plurality of channels, wherein each channel has a different setting for top products or services;
   said processor configured for proactively identifying a user need and initiating user contact and/or interaction through any of chat sessions and telephonic contact with a call center;
   said processor configured for, during user interaction, determining a specific type of user engagement mode based upon the intent of the user; and
   said processor configured for providing a recommendation to said user based on any of information gathered through said contact and/or interaction and past user activities.

2. The method of claim 1, further comprising:
   applying user preferences in connection with determining and ranking said recommendations.

3. The method of claim 1, further comprising:
   applying user related information in connection with determining and ranking said recommendations.

4. The method of claim 3, wherein said user related information comprises any of past interactions, previous purchase history, geographical location, time of day, client device used, operating system, and a current browsing session.

5. The method of claim 1, wherein said plurality of channels comprises at least two of the group of Web, mobile, interactive voice response (IVR), phone, automotive, and television.

6. The method of claim 1, further comprising:
   said user interacting with a product or service provider in connection with any of said query and said recommendations.

7. The method of claim 1, wherein said unique identifiers are created, captured, and/or passed between said plurality of channels to identify and tag the user and the user's context uniquely for any of history, past behavior, steps progressed, obstacles, and issues encountered.

8. The method of claim 1, further comprising:
said processor configured for implementing an intent module for receiving a query from said user;
said intent module matching said received query to a previous query to identify a set of resources that are relevant to both said received query and to each of the items in said set of resources;
said intent module compiling information concerning prior user search behavior; and
said intent module inferring said user's interests and intent from said information.

9. The method of claim 8, further comprising:
said intent module presenting more relevant search results to subsequent users who are executing a same or a similar search query.

10. The method of claim 1, further comprising;
collecting said information from a plurality of users and compiling or aggregating said information to provide a statistical model.

11. The method of claim 1, further comprising:
said processor configured for implementing a monitoring module for tracking user activities.

12. The method of claim 1, further comprising:
said intent prediction module recording each selection in said sequence of prior selections and adding a most recent selection to said sequence of prior selections that define a journey taken by said user when said user initiates a series of selections online;
said intent prediction module comparing a journey or sequence currently selected to the most frequent sequences of selections made by a plurality of users; and
said intent prediction module predicting a current intent of said user therefrom;
wherein relevant information is displayed or other actions are undertaken to assist said user in making additional or future selections that are necessary to achieve a desired end result.

13. The method of claim 1, further comprising:
identifying user preferences based upon user-related information, wherein said user-related information comprises any of past interactions, purchase history, geographical location, time of day, client device used, ands operating system.

14. The method of claim 1, further comprising:
considering said user's original intent and preferences on a decision level; and
considering users who exhibit similar intent on an aggregate level to have similar preferences to said user.

15. The method of claim 1, further comprising:
said intent prediction module learning user preferences; and
said intent prediction module assigning a score or rating once said preferences are learned.

16. The method of claim 1, further comprising:
based on said user's exhibited behavior, adjusting a weightage assigned to one or more specific product or service features to be high when compared to other product or service features.

17. The method of claim 1, further comprising:
generating a score for user preferences by any of a ranking procedure and statistical functions;
assigning said user different weights for each of one or more product or service features, wherein all of the weights considered together comprise a preference.

18. The method of claim 17, further comprising:
aggregating said weights for user preferences by either of multiplication or addition of each weight into a single score for a specific product or service.

19. The method of claim 16, further comprising:
adjusting a default preference to be in line with said user's exhibited behavior as more information about user interaction is known.

20. An apparatus for making recommendations to a user, comprising:
a processor receiving a query from a user through a plurality of channels;
during a data fusion stage, said processor using said customer's Web journey, multi-channel journeys, and activities that generate data from multi-channels to match the query received from the user with a previous query from any of said user and one or more other users;
said processor combining data from said plurality of channels in real time to predict user intent in connection with said identified resources, wherein unique identifiers are created, captured, and/or passed between said plurality of channels to identify and tag the user and the user's context uniquely;
during an intent prediction stage, said processor configured for predicting in real time an outcome of a future selection by said user from a sequence of previous selections made by any of said user and from one or more frequent sequences of previous selections made by a plurality of users;
said processor using activities of a group of similar users to provide a basis for determining a current user's intent where insufficient information is available about said user or said user is a new visitor;
during a recommendation stage, said processor collecting and analyzing information gathered during previous visits of one or more users, including that of a current user, to determine in descending order a most frequent sequence of selections;
said processor ranking results of said predicting;
said processor presenting a ranked order of recommended results to said user;
said processor displaying products or services having the highest scores through any of a plurality of channels, wherein each channel has a different setting for top products or services;
said processor proactively identifying a user need and initiating user contact and/or interaction through any of chat sessions and telephonic contact with a call center;
said processor, during user interaction, determining a specific type of user engagement mode based upon the intent of the user; and
said processor providing a recommendation to said user based on any of information gathered through said contact and/or interaction and past user activities.

21. A computer implemented method for making recommendations to a user, comprising:
providing a processor configured for receiving a query from a user through a plurality of channels;
said processor configured for using said customer's Web journey, multi-channel journeys, and activities that generate data from multi-channels to match the query received from the user with a previous query from any of said user and one or more other users;
said processor configured for combining data from said plurality of channels in real time to predict user intent in connection with said identified resources, wherein unique identifiers are created, captured, and/or passed between said plurality of channels to identify and tag the user and the user's context uniquely;

said processor configured for predicting in real time an outcome of a future selection by said user from a sequence of previous selections made by any of said user and from one or more frequent sequences of previous selections made by a plurality of users;

said processor configured for collecting and analyzing information gathered during previous visits of one or more users, including that of a current user, to determine in descending order a most frequent sequence of selections;

said processor configured for ranking results of said predicting;

said processor configured for presenting a ranked order of recommended results to said user;

said processor configured for displaying products or services having the highest scores through any of a plurality of channels; and said processor configured for providing a recommendation to said user based on any of information gathered through said contact and/or interaction and past user activities.

22. The method of claim 21, further comprising:

said processor configured for proactively identifying a user need and initiating user contact and/or interaction through any of chat sessions and telephonic contact with a call center.

23. The method of claim 21, further comprising:

said processor configured for, during user interaction, determining a specific type of user engagement mode based upon the intent of the user.

* * * * *